United States Patent [19]

Burrus, Jr. et al.

[11] Patent Number: 4,515,612

[45] Date of Patent: May 7, 1985

[54] METHOD FOR OPTICAL FIBER FABRICATION INCLUDING DEUTERIUM/HYDROGEN EXCHANGE

[75] Inventors: Charles A. Burrus, Jr., Fair Haven; Julian Stone, Rumson, both of N.J.

[73] Assignee: AT&T Bell Laboratories, Murray Hill, N.J.

[21] Appl. No.: 469,830

[22] Filed: Feb. 25, 1983

Related U.S. Application Data

[63] Continuation-in-part of Ser. No. 369,605, Apr. 19, 1982, abandoned, which is a continuation of Ser. No. 194,882, Oct. 7, 1980, abandoned.

[51] Int. Cl.$^3$ ............................................. C03B 20/00
[52] U.S. Cl. .................................... 65/3.12; 65/30.1; 65/30.13
[58] Field of Search ................ 65/2, 3.12, 30.1, 30.13; 427/163; 350/96.34

[56] References Cited

U.S. PATENT DOCUMENTS

| | | | |
|---|---|---|---|
| Re. 28,029 | 6/1974 | Keck et al. | 65/3.12 |
| 3,791,714 | 2/1974 | Maurer | 65/3.12 X |
| 3,877,912 | 4/1975 | Shiraishi et al. | 65/3.11 |
| 3,933,454 | 1/1976 | DeLuca | 65/3.12 |
| 4,217,027 | 8/1980 | MacChesney et al. | 65/3.12 X |
| 4,282,196 | 9/1981 | Kometani et al. | 423/337 |
| 4,389,230 | 6/1983 | Modone et al. | 65/3.12 |

OTHER PUBLICATIONS

Stone et al., "Reduction of the 1.38 $\mu$m Water Peak . . . ", The Bell System Technical Journal, vol. 59, No. 8, 1980, pp. 1541–1548.
Modone et al., "OH Reduction in Preforms by Isotope Exchange", Electronics Letters, vol. 17, No. 21, 15 Oct. 1981, pp. 815–817.
Stone et al. "Reduction of Loss Due to OH in Optical Fibers . . . ", Electronics Letters, vol. 18, No. 2, 21 Jan. 1982, pp. 78–80.
Stone et al., and Modone et al., Comment and Reply, Electronics Letters, vol. 18, No. 4, 18 Feb. 1982, pp. 185 and 186.
Kato et al., "Isotopic Chemical Vapor Deposition . . . ", Applied Optics, vol. 16, No. 6, Jun. 1977, pp. 1453 and 1454.
Moriyama et al., "Ultimately Low OH Content V.A.D . . . ", Electronics Letters, vol. 16, No. 18, 1980, pp. 698 and 699.
Hanawa et al., "Fabrication of . . . V.A.D Fibre", Electronics Letters, vol. 16, No. 18, 1980, pp. 699 and 700.
Izawa et al., "Continuous Fabrication of High Silica Fiber Preform" Int. Conf. on Integrated Optics and Optical Communications, Tokyo, 1977, pp. 375–378.
Lee, "Diffusion of Hydrogen in . . . Quartz," The Journal of Chemical Physics, vol. 38, No. 2, Jan. 15, 1963, pp. 448–455.
Shelby, "Molecular Diffusion and Solubility of Hydrogen Isotopes . . . ", J. Applied Physics, vol. 48, No. 8, Aug. 1977, pp. 3387–3394.
Shelby et al., "Radiation Induced Isotope Exchange . . . ", J. Applied Physics, vol. 50, No. 8, Aug. 1979, pp. 5533–5535.

Primary Examiner—William Smith
Assistant Examiner—Michael K. Boyer
Attorney, Agent, or Firm—Eugene E. Pacher

[57] ABSTRACT

A method for manufacturing silica-based optical fiber, and for manufacturing optical fiber preforms, the method comprising deuterium/hydrogen exchange in the silica-based material carried out subsequent to formation of the silica.

7 Claims, No Drawings

METHOD FOR OPTICAL FIBER FABRICATION INCLUDING DEUTERIUM/HYDROGEN EXCHANGE

CROSS REFERENCE TO RELATED APPLICATIONS

This application is a continuation-in-part of our co-pending application, Ser. No. 369,605, filed April 19, 1982, now abandoned, which was a continuation of application, Ser. No. 194,882, filed Oct. 7, 1980, now abandoned.

BACKGROUND OF THE INVENTION

1. Field of the Invention

This invention relates to methods for fabrication of optical fiber and of optical fiber preforms.

2. Description of the Prior Art

Long distance optical communications has recently made great progress, primarily due to the availability of low-loss optical fiber. As is well known, electromagnetic radiation traveling through an optical waveguide, a fiber, is subject to attenuation due to several mechanisms. Although some of these are essentially irreducible, such as the so-called Rayleigh scattering, others can be eliminated or at least substantially reduced. Among the latter is attenuation due to absorption by impurities present in the guiding region of the fiber, and it is with this attenuation mechanism that this application is concerned.

A particularly important absorbing species is the hydroxyl radical ($OH^-$), which is formed when hydrogen is present in the fiber material. OH present in silica-based optical fiber causes, inter alia, absorption of electromagnetic radiation of wavelengths in the region of current interest for long-distance optical communication, i.e., the wavelength region of about 0.8 to 1.6 $\mu$m. The OH absorption peaks in this wavelength region are due to overtones or combination tones of vibrations at longer wavelengths. For instance, the peaks at about 1.38 and 0.95 $\mu$m are caused by overtones of the fundamental OH frequency at about 2.75 $\mu$m, whereas the peak at about 1.24 $\mu$m is due to a combination tone due to OH and a vibration frequency of $SiO_2$.

Although recently great progress has been achieved in reducing the OH-content of the guiding region of silica-based optical waveguides, the so-called core, by "drying" with, e.g., chlorine, other approaches for reducing the OH-caused loss are clearly of interest. In pinciple, one such other approach comprises shifting the relevant vibration modes of OH to longer wavelengths, thereby reducing the absorption due to OH in the wavelength region of interest. Such a shift to longer wavelengths would occur if a heavier atom could be substituted for hydrogen in OH, since typically such substitution causes a decrease in the vibrational frequencies proportional to approximately the square root of the ratio of the masses. In particular, substituting deuterium for hydrogen would have the desired effect, since the former has approximately double the mass of the latter. Of course, such deuterium/hydrogen (D/H) exchange results in the appearance of OD absorption lines in the relevant wavelength regime. However, these lines are due to higher overtones, and thus weaker by typically 1-2 orders of magnitude.

It is well known that both hydrogen and deuterium diffuse readily in vitreous silica, and that at elevated temperatures, as well as under other conditions (e.g., irradiation with energetic electromagnetic radiation, typically of wavelength $\lesssim$100 Angstroms), deuterium can undergo an exchange reaction with hydrogen. See, for instance, R. W. Lee, *The Journal of Chemical Physics*, Volume 38(2), pp. 448-455 (1963), and J. E. Shelby et al., *Journal of Applied Physics*, Volume 50(8), pp. 5533-5535 (1979).

Methods for manufacturing optical fiber preforms and for producing optical fibers therefrom, as well as fiber designs and properties of structures embodying these designs, are well known in the art and will not be discussed herein. For an exhaustive treatment of these and related topics, see, for instance, *Optical Fiber Telecommunications*, S. E. Miller and A. G. Chynoweth, editors, Academic Press (1979), incorporated herein by reference.

SUMMARY OF THE INVENTION

We have discovered that the known process of deuterium/hydrogen exchange in vitreous silica containing OH can be applied to silica-based optical fibers and to optical fiber preforms (i.e., the bodies from which fibers are drawn), resulting, inter alia, in a lowering of the fiber loss, principally in the wavelength region from about 0.8 to about 1.6 $\mu$m, if applied to material containing a nonnegligible amount of hydrogen bonded to oxygen. Significant loss reduction typically can be obtained in material containing more than about 0.1 ppm of hydrogen but the process can be used with material of even lower hydrogen content. This exchange can be carried out without significantly affecting important fiber parameters such as refractive index profile, or numerical aperture, bandwidth, scattering loss, and absorption due to species other than OH. D/H exchange thus constitutes a new method for reducing OH-caused absorption in silica-based optical fiber, which can be carried out instead of, or in conjunction with, methods for reducing the OH-content of fiber material by prior art chemical means.

Use of D/H exchanged substrate material, typically silica tubes, in preform fabrication also permits reduction in thickness, or elimination of the H-diffusion barrier layer or, in preforms that do not comprise a barrier layer (e.g., preforms for some types of single mode fiber), reduction of the thickness of the deposited cladding layer, resulting typically in reduced production cost. Furthermore, use of D/H exchanged fused silica preform rods (or thick-walled fused silica "capillary" tubing) for producing step-index fiber comprising a silica core and nonglass, typically polymer, cladding, permits use of relatively "wet", i.e., OH-rich, silica starting material.

DETAILED DESCRIPTION

We have discovered that the ability of deuterium to efficiently undergo an exchange reaction with hydrogen bonded to oxygen in vitreous silica can be advantageously applied to reducing the absorption of electromagnetic radiation in silica-based optical fiber waveguides in the wavelength region from approximately 0.8 to about 1.6 $\mu$m, especially between about 1.2 and 1.6 $\mu$m, and, most notably, in the vicinity of OH-absorption peaks in this region.

The diffusion characteristics of deuterium in glassy silica are very similar to those of hydrogen. See for instance, R. W. Lee, op. cit., incorporated herein by reference. Since both isotopes diffuse relatively quickly in such silica at temperatures above room temperature, deuterium can diffuse through macroscopic distances in relatively short periods of time. Since the required diffusion distance depends on the details of the sample in which the exchange is to take place, it is generally not possible to set quantitative limits on this distance. By "substantial" diffusion we thus mean diffusion carried out at such temperature and for such time that the mean diffusion distance x as determined by the expression $x^2 = Dt$, there D is the effective diffusion coefficient, and t the diffusion time, is at least approximately of the same order of magnitude as the thickness of the layer of material in which D/H exchange is to be achieved. The amount of deuterium incorporated into the bulk of a sample is, inter alia, a function of the partial pressure of deuterium present in the atmosphere in contact with the sample. For practical purposes, this partial pressure should typically be at least about 10 Torr.

When diffusing deuterium atoms encounter OH they can undergo a reversible exchange reaction with the bound hydrogen. This reaction typically is very efficient, thus the number of deuterium atoms need not greatly exceed the number of bound hydrogen atoms in order to get substantial D/H exchange. By "substantial" exchange we mean measurable exchange, typically of the order of 10% or more, or incorporation of about 0.1 ppm of OD, whichever is less. "Substantial" exchange results in the presence of a "substantial" amount of deuterium, and D/H exchanged material comprises typically more than about 0.1 ppm of OD. The debonded hydrogen is mobile and can, unless undergoing the reverse reaction, encountering a trapping site, or becoming relatively immobile due to a drop in the sample temperature, diffuse to a surface and be lost from the sample. Any OD incorporated into the sample contributes little to absorption of light in the relevant wavelength regime since the specific absorption due to OD is about two orders of magnitude less than that of OH in the relevant wavelength region.

The presence of OH in $SiO_2$ results in an apparent decrease of the deuterium diffusion coefficient, due to the coupling of diffusion with a chemical reaction, the D/H exchange. The effective diffusion coefficient for D/H exchange in $SiO_2$ is therefore smaller than the true diffusion coefficient determined in, e.g., H-free $SiO_2$, and depends on the H-concentration in the material.

The exchange reaction, i.e., the reaction $D + OH \rightleftharpoons H + OD$, requires elevated temperatures to proceed at significant rates. We found that about 300 degrees C. is the lower limit for achieving rates that are of practical interest. Thus, it is, in principle, possible to separate in time diffusion and exchange, leading to the possibility of separate processing steps. The D/H exchange reaction typically can proceed at any temperature above the minimum temperature, up to, and even above, the softening temperature of the glass.

Since optical fibers typically comprise, in addition to silica, other glass-forming oxides, the choice of temperature for carrying out the exchange depends not only on the kinetics of that reaction but also, inter alia, on properties of the nonsilica oxide components of the fiber material. For instance, germania ($GeO_2$) has a considerably higher vapor pressure than $SiO_2$ within the temperature range of interest here. Since this can lead to differential loss of Ge at high temperatures (burn-off), either the exchange temperature is to be chosen low enough for this burn-off effect to be insignificant, or other appropriate measures are to be taken to avoid occurrence of substantial burn-off.

Since the mode of practicing the invention typically depends on the method used for fabrication of the fiber, more particularly, the method used for fabrication of the body from which the fiber is drawn, the so-called preform, we will now briefly discuss some aspects of preform fabrication. In its final form, a preform typically is a cylindrical rod of circular cross-section, having a radially nonuniform refractive index distribution. However, we intend the term "preform" also to include glass rods or thick-walled glass "capillary" tubes, having substantially radially uniform refractive index, from which the glass core of polymer clad and similar fibers is to be drawn.

Fiber is produced by drawing from the preform, and the radial refractive index distribution existing in the preform material is transferred substantially without change (other than a change in scale) to the fiber in this process. The fiber core, i.e., the central region of the fiber, is the part of the fiber through which the guided electromagnetic radiation, referred to herein as "light," propagates, and thus it is primarily the core (and, in single mode fibers, also the cladding region adjacent to the core) that needs to exhibit low attenuation for light of the desired wavelength.

The D/H exchange in the relevant material can be carried out in the fiber, but it is preferably carried out in the preform. Since the strategies for accomplishing the exchange in the preform depend on the method of fabrication of the preform, we will next briefly discuss relevant distinctions.

Preforms having a radially nonuniform refractive index distribution are generally produced by deposition, on a solid surface, of glassy particles formed by appropriate chemical vapor phase reaction. Typically, at least some of the constituents of a moving vapor stream comprising at least one glass-forming precursor (e.g., $SiCl_4$, $GeCl_4$) and an oxidizing medium (e.d., $O_2$) are caused to react in a reaction zone. The deposition of the glassy particles can take place in a variety of ways, for instance on a mandrel (which is removed later), on the inside of, e.g., a substrate tube, with the tube material becoming part of the cladding of the fiber, or by axial deposition on a rotating plane substrate that is axially withdrawn at the rate of build-up of the deposit, resulting in creation of a solid cylinder of deposited material, around which a sleeve tube can be shrunk later. The deposit typically is porous, and thus needs to be consolidated into a homogeneous state before it is capable of low-loss transmission of light. This consolidation is typically achieved by appropriate application of heat. Consolidation can, in principle, be carried out either continuously throughout the period of deposition, intermittently during that period, or after completion of the deposition process. In practice, the latter approach is typically used in the above-described axial deposition process (Vaporphase Axial Deposition (VAD) process), whereas intermittent consolidation is typically used when depositing on the interior surface of a substrate tube, as in the Modified Chemical Vapor Deposition (MCVD) process. Preforms thus can consist either completely of "deposited" glass (i.e., glass formed during preform manufacture by a glass-forming chemical reaction such as the above described gas-phase reaction), of deposited glass in addition to "undeposited" glass (i.e., glass derived from a glass body not formed during preform manufacture by a glass-forming reaction, such as fused quartz from a pre-existing fused quartz substrate tube), or even completely of undeposited glass. The first is, for instance, the case in a variant of the above-mentioned VAD process, the second is the case, for instance, in the MCVD process, or in VAD with sleeve tube, and the third in producing polymer-clad fused quartz fiber.

If at some point of the preform manufacturing process the complete unconsolidated deposit is available for processing, then our invention can be practiced by exposing the unconsolidated deposit to an atmosphere containing deuterium for a sufficient length of time to permit diffusion of the deuterium throughout the volumes of interest. Since in this case these volumes are essentially those of the individual deposited particles, this time will be typically quite short at elevated temperatures. The D/H exchange reaction can be permitted to take place either simultaneously with the diffusion ("loading") step by maintaining the porous body at a temperature greater than about 300 degrees C. during exposure to the deuterium, or it can be carried out during a subsequent step. If carried out subsequently, it can either be done as a separate step or during, e.g., preform consolidation.

If the completed unconsolidated deposit is not available at some point during the manufacturing process of a preform, as is typically the case in the MCVD process, then different schemes can be used to practice our invention. One possibility is to contact the consolidated deposit with an atmosphere containing deuterium for a length of time sufficient to permit diffusion of deuterium for a sufficient distance into the deposit. Since, for instance, at 900 degrees C. in vitreous silica, the time required for deuterium to diffuse a distance of about 1 millimeter is, according to the data presented by R. W. Lee (op. cit.) only of the order of minutes, the time required to accomplish the necessary diffusion is typically not impractically long. The exchange step can either be carried out simultaneously with the diffusion step or at a subsequent time, as for instance during collapsing the tubular preform. In the latter case, or if the exchange step is carried out at a relatively high temperature where loss of one of the constituents of the consolidated glassy deposit may become significant, it is advantageous to arrange for the hot surface of the deposit to be in contact with an atmosphere designed to compensate for the loss, although in some cases deuteration and compensation cannot be carried out simultaneously. For instance, in silica/germania glasses, germania has a sufficiently high vapor pressure such that loss of germania during collapse is significant. This can be prevented or at least reduced when carrying out the collapse in the presence of a precursor, typically $GeCl_4$. But since chlorine readily reacts with deuterium, any deuteration has to be carried out prior to compensated collapse. Since in the MCVD process consolidation of any individually deposited layer generally takes place before deposition of the succeeding layer, it is of course also possible to carry out the D/H exchange layer by layer. Other embodiments of the invention exist or can be readily devised by those skilled in the art. Some further exemplary embodiments will now be discussed.

MCVD-produced multimode fiber preforms typically comprise a "barrier" layer, deposited onto the inner substrate surface, that serves to prevent contamination of the deposited cladding (and the core) from the OH contained in many of the currently used fused-silica substrate tubes. Such barrier layer can be eliminated, or at least reduced in thickness, if at least the tube volume adjacent to the inner tube surface is deuterated (D/H exchanged) prior to glass deposition thereon. This can be accomplished, for instance, by maintaining the tube at an elevated temperature in an appropriate deuterium-containing atmosphere, or by maintaining such an atmosphere within the bore of a heated tube. Similarly, in at least some types of prior art single-mode fiber the deposited cladding layer is relatively thick, to insure that no significant substrate penetration by the guided radiation occurs. Using D/H exchanged substrate material in the production of such single mode fiber may permit use of thinner deposited cladding than is required in prior art fiber.

For some applications of optical fiber it may be advantageous to use fibers having a glass core, typically a fused silica core with uniform refractive index, and a nonglass, typically polymer, cladding of lower refractive index than the core. Such fibers, collectively referred to as "polymer-clad fibers" can be produced by drawing the fiber core from a solid rod preform or a thick-walled "capillary" preform tube, and coating the glass fiber in the usual manner. Our invention can advantageously be applied in the production of such fiber. In particular, use of a D/H exchanged preform may result in lower loss fiber, and/or may permit use of "wetter" silica (i.e., higher OH-content silica) than would be possible without D/H exchange.

The deuteration of fused silica substrate tubes and preform rods or tubes as described above need not necessarily take place just prior to preform manufacture and fiber drawing, respectively. It may be advantageous to deuterate such tubes or rods during the manufacture thereof, and supply the deuterated articles to the fiber manufacturer. Deuteration of the silica can of course take place at any appropriate stage of the article manufacturing process, for instance, after forming of the tube or rod.

EXAMPLE 1

The inside of a tubular preform comprising a fused silica substrate tube and deposited, MCVD-produced, glass, with the deposited and consolidated reaction product comprising an approximately 0.2 mm thick layer of silica and germania, is exposed to an atmosphere consisting substantially of deuterium at approximately ambient pressure, while maintaining the deposited layer at a temperature of at least about 800 degress C. by means of heat sources external to the preform, while rotating the horizontally disposed preform to prevent its sagging.

Maintaining these conditions for about 5 minutes results in diffusion of deuterium throughout substantially all of the deposited layer, to replacement of a substantial fraction of the hydrogen present in the deposited layer, and to out-diffusion of a part of the replaced hydrogen from the layer.

EXAMPLE 2

A solid cylindrical preform, produced by VAD, with the deposited and unconsolidated reaction product comprising silica and germania, is maintained at approximately 700 degrees C. and exposed to an atmosphere, of approximately ambient pressure, comprising nitrogen, and deuterium at a partial pressure of approximately 100 Torr, for approximately 30 seconds. Following this deuteration step, the unconsolidated preform is "dried" in the usual manner. (See for instance T. Moriyama et al., *Electronics Letters*, Vol. 16(18), pp.

698–699, (1980), and T. Hanawa et al., ibid., pp. 699–700.)

EXAMPLE 3

One half of a silica substrate tube (3 mm wall thickness, 25 mm outer diameter) containing about 100 ppm of OH was maintained in about 760 Torr of $D_2$ at about 1000 degrees C. for 90 hours, resulting in substantially complete D/H exchange therein. This tube was used as the substrate for deposition, by MCVD, of fiber cladding and core material for a multimode fiber in the usual manner. The barrier layer was omitted. The fiber that was drawn from the deuterated part of this preform had (at 1.39 μm) an OH-loss (i.e., loss above the Rayleigh scattering loss) of about 1 db/km, whereas fiber from the undeuterated part of the preform had about 4 db/km OH-loss. The OH-loss of the fiber made from the deuterated preform part was substantially the same as that observed in fiber made, with a 5 μm thick barrier layer, using an undeuterated substrate. Fibers from a similarly prepared preform without barrier layer that used a substrate tube containing less than 5 ppm of OH had (at 1.39 μm) and OH-loss of 0.7 db/km and 0.9 db/km, respectively.

EXAMPLE 4

Substantially complete D/H exchange (about 760 Torr $D_2$, 900 degrees C., 24 hours) was carried out in the central section of a fused silica tube (3 mm wall thickness, 25 mm outer diameter) containing about 100 ppm of OH. Onto the inside of this substrate tube was deposited a 2.5 μm thick $SiO_2$ barrier layer, and conventional cladding and core material. Fiber drawn from the ends of the preform had 1.94 db/km and 2.2 db/km OH-loss at 1.39 μm, and fiber drawn from the deuterated central part of the preform had an OH-loss of 0.29 db/km. Fiber drawn from a similarly prepared preform that had a 6.9 μm thick barrier layer had a 1.39 μm OH-loss of 0.82 db/km (undeuterated) and 0.33 db/km (deuterated).

EXAMPLE 5

A thick-walled fused silica "capillary" tube (10 mm outer diameter, 2 mm inner diameter) containing about 100 ppm of OH is maintained in 760 Torr of $D_2$ at 900 degrees C. for 8 days, resulting in substantially complete D/H exchange throughout the tube.

What is claimed is:

1. Method for fabrication of an optical fiber preform comprising silica-based glassy material, the method comprising
   (a) chemically reacting at least some of the constituents of a moving stream of gas mixture comprising at least one glass-forming precursor compound and an oxidizing medium, the reaction resulting in the formation of a glassy silica-based reaction product,
   (b) forming a body by depositing at least a part of the reaction product on a substrate, at least part of the material of the body containing hydrogen bonded to oxygen, and
   (c) consolidating at least part of the deposited product by means of a hot zone produced by a heat source external to the body,
   characterized in that the method further comprises
   (d) replacing at least part of the hydrogen bonded to oxygen with deuterium in a deuterium/hydrogen exchange step carried out subsequent to step (b).

2. Method of claim 1, wherein step (d) comprises
   (a) contacting at least a part of the body with an atmosphere having a partial pressure of at least about 10 Torr of deuterium, and
   (b) maintaining at least substantially the part of the body at a temperature greater than about 300 degrees C.

3. Method for fabrication of an optical fiber preform comprising glassy silica-based material, the method comprising
   (a) forming a tubular body by depositing silica-based glassy material in substantially porous, unconsolidated form on the inside surface of a tube comprising silica, at least part of the material of the tubular body containing hydrogen bonded to oxygen, and
   (b) consolidating the deposited material by means of a hot zone produced by a heat source external to the tube,
   characterized in that the method further comprises
   (c) replacing at least part of the hydrogen bonded to oxygen with deuterium in a deuterium/hydrogen exchange step carried out sbsequent to step (a).

4. Method of claim 3 where step (c) comprises contacting at least part of the interior surface of the tubular body with an atmosphere having a partial pressure of at least about 10 Torr of deuterium, and maintaining at least substantially the part of the surface at a temperature above 300 degrees C. for a period sufficient to result in substantial diffusion of deuterium into the tubular body.

5. Method of claim 4 wherein the atmosphere further comprises at least one glass-forming precursor compound.

6. Method of claim 4 wherein steps (a), (b), and (c) of claim 4 are carried out more than once in succession.

7. Method for fabrication of an optical fiber comprising glassy silica-based material, the method comprising
   (a) forming a tubular body by depositing silica-based glassy material in substantially porous, unconsolidated form on the inside surface of a tube comprising silica, at least part of the material of the tubular body containing hydrogen bonded to oxygen,
   (b) consolidating the deposited material by means of a hot zone produced by a heat source external to the tubular body,
   (c) drawing the optical fiber from a preform formed from the consolidated tubular body,
   characterized in that the method further comprises
   (d) exposing, prior to carrying out step (a), at least a part of the tube to an atmosphere having a partial pressure of at least about 10 Torr of deuterium, and maintaining at least substantially the part of the tube at a temperature above about 300 degrees C. for a period sufficient to result in substantial deuterium/hydrogen exchange in at least some of the material of the tube.

* * * * *